United States Patent
Chuang et al.

(10) Patent No.: US 11,080,532 B2
(45) Date of Patent: Aug. 3, 2021

(54) HIGHLIGHT PROCESSING METHOD USING HUMAN POSE BASED TRIGGERING SCHEME AND ASSOCIATED SYSTEM

(71) Applicant: MEDIATEK INC., Hsin-Chu (TW)

(72) Inventors: Shih-Jung Chuang, Hsin-Chu (TW); Yan-Che Chuang, Hsin-Chu (TW); Chun-Nan Li, Hsin-Chu (TW); Yu-Hsuan Huang, New Taipei (TW); Chih-Chung Chiang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 105 days.

(21) Appl. No.: 16/544,862

(22) Filed: Aug. 19, 2019

(65) Prior Publication Data

US 2020/0226386 A1 Jul. 16, 2020

Related U.S. Application Data

(60) Provisional application No. 62/792,984, filed on Jan. 16, 2019.

(51) Int. Cl.
*G06K 9/00* (2006.01)

(52) U.S. Cl.
CPC ..... *G06K 9/00744* (2013.01); *G06K 9/00355* (2013.01); *G06K 9/00369* (2013.01); *G06K 9/00718* (2013.01)

(58) Field of Classification Search
CPC ........... G06K 9/00744; G06K 9/00369; G06K 9/00718; G06K 9/00355
See application file for complete search history.

(56) References Cited

U.S. PATENT DOCUMENTS

| | | | | |
|---|---|---|---|---|
| 2012/0057775 | A1* | 3/2012 | Suzuki | H04N 5/781 382/154 |
| 2013/0004090 | A1* | 1/2013 | Kundu | G06Q 20/20 382/232 |
| 2016/0292509 | A1* | 10/2016 | Kaps | A63F 13/00 |
| 2017/0359549 | A1* | 12/2017 | Baran | H04N 5/3532 |

(Continued)

FOREIGN PATENT DOCUMENTS

| CN | 101611624 B | 5/2012 |
|---|---|---|
| CN | 102890781 A | 1/2013 |

(Continued)

OTHER PUBLICATIONS

Wang, "Action snapshot with single pose and viewpoint", Apr. 2019.

(Continued)

*Primary Examiner* — Md K Talukder
(74) *Attorney, Agent, or Firm* — Winston Hsu

(57) ABSTRACT

A highlight processing method includes: obtaining a frame sequence that includes frames each having image contents associated with at least one object, wherein object pose estimation is performed upon each frame of the frame sequence to generate an object pose estimation result of each frame, and further includes determining at least one of a start point and an end point of a highlight interval, wherein comparison of object pose estimation results of different frames is involved in determination of at least one of the start point and the end point of the highlight interval.

18 Claims, 12 Drawing Sheets

F_1

$P_{t1}=(J_{t10},J_{t11},\ldots,J_{t1k})$
$B_{t1}=(B_{t10},B_{t11},\ldots,B_{t1n})$
$B_{t1i}=(J_{t1i0},J_{t1i1},\ldots,J_{t1im})$

F_2

$P_{t2}=(J_{t20},J_{t21},\ldots,J_{t2k})$
$B_{t2}=(B_{t20},B_{t21},\ldots,B_{t2n})$
$B_{t2i}=(J_{t2i0},J_{t2i1},\ldots,J_{t2im})$ Time step t_2-t_1

(56) References Cited

U.S. PATENT DOCUMENTS

| | | | | |
|---|---|---|---|---|
| 2019/0147221 A1* | 5/2019 | Grabner | ................... | G06T 7/75 |
| | | | | 382/103 |
| 2020/0074678 A1* | 3/2020 | Ning | ........................ | G06T 7/73 |
| 2020/0226386 A1* | 7/2020 | Chuang | .............. | G06K 9/00355 |

FOREIGN PATENT DOCUMENTS

| CN | 104660948 A | 5/2015 |
|---|---|---|
| CN | 107169988 A | 9/2017 |
| CN | 107396019 A | 11/2017 |

OTHER PUBLICATIONS

MarcoHu(mansonfat), "Use Samsung Galaxy S9, S9+ super slow motion "auto" to take pictures of wonderful moments!", https://www.eprice.com.tw/mobile/talk/4523/5054710/1/rv/samsung-galaxy-s9-plus-256gbreview/, Feb. 25, 2018, pp. 1-12.

* cited by examiner

F_1                                    F_2

Time step
$t\_2 - t\_1$ $P_{t1}=(J_{t10}, J_{t11},\ldots, J_{t1k})$        $P_{t2}=(J_{t20}, J_{t21},\ldots, J_{t2k})$
$B_{t1}=(B_{t10}, B_{t11},\ldots, B_{t1n})$        $B_{t2}=(B_{t20}, B_{t21},\ldots, B_{t2n})$
$B_{t1i}=(J_{t1i0}, J_{t1i1},\ldots, J_{t1im})$    $B_{t2i}=(J_{t2i0}, J_{t2i1},\ldots, J_{t2im})$

HIGHLIGHT PROCESSING METHOD USING HUMAN POSE BASED TRIGGERING SCHEME AND ASSOCIATED SYSTEM

CROSS REFERENCE TO RELATED APPLICATIONS

This application claims the benefit of U.S. provisional application No. 62/792,984, filed on Jan. 16, 2019 and incorporated herein by reference.

BACKGROUND

The present invention relates to an image/video processing technique, and more particularly, to a highlight processing method using human pose based triggering scheme and an associated system.

A user may enable an action snapshot capture function to record highlight picture(s) during a picture capture process, and may enable a slow motion video encoding function (or a slow motion video post-production function) to record highlight video clip(s) during a video recording process (or a video playback process). There are multiple approaches for achieving action snapshot capture, slow motion video encoding, and slow motion video post-production. However, some of the conventional approaches are user unfriendly due to the fact that the user needs to determine and select the highlight contents manually, some of the conventional approaches generate content-constrained snapshot pictures/slow motion video clips, and some of the conventional approaches do not generate content-based snapshot pictures/slow motion video clips.

SUMMARY

One of the objectives of the claimed invention is to provide a highlight processing method using human pose based triggering scheme and an associated system.

According to a first aspect of the present invention, an exemplary highlight processing method is disclosed. The exemplary highlight processing method includes: obtaining a frame sequence that comprises frames each having image contents associated with at least one object, wherein object pose estimation is performed upon each frame of the frame sequence to generate an object pose estimation result of said each frame; and determining, by a processing circuit, at least one of a start point and an end point of a highlight interval, wherein comparison of object pose estimation results of different frames is involved in determination of said at least one of the start point and the end point of the highlight interval.

According to a second aspect of the present invention, an exemplary highlight processing system is disclosed. The highlight processing system includes a storage device and a processing circuit. The storage device is arranged to store a program code. When loaded and executed by the processing circuit, the program code instructs the processing circuit to perform following steps: obtaining a frame sequence that comprises frames each having image contents associated with at least one object, wherein object pose estimation is performed upon each frame of the frame sequence to generate an object pose estimation result of said each frame; and determining at least one of a start point and an end point of a highlight interval, wherein comparison of object pose estimation results of different frames is involved in determination of said at least one of the start point and the end point of the highlight interval.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
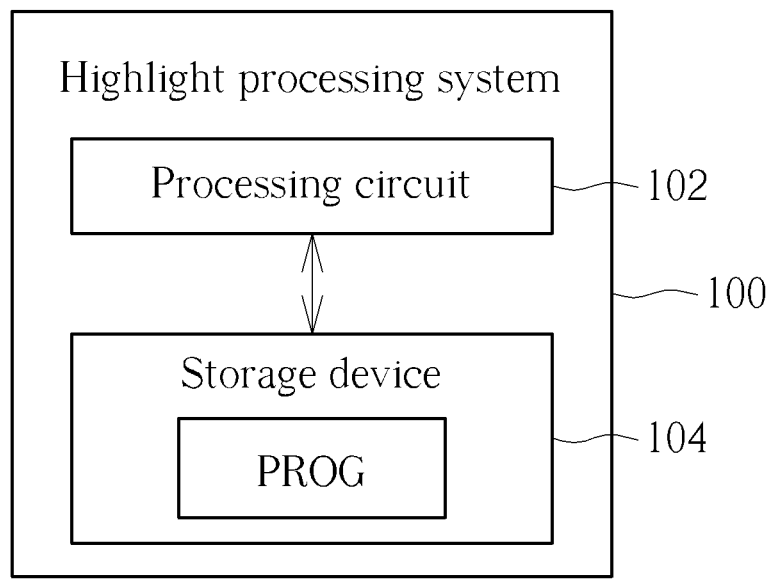
FIG. 1 is a diagram illustrating a highlight processing system according to an embodiment of the present invention.

FIG. 1 is a diagram illustrating a highlight processing system according to an embodiment of the present invention. The highlight processing system 100 includes a processing circuit 102 and a storage device 104. The storage device 104 is arranged to store a program code PROG. When loaded and executed by the processing circuit 102, the program code PROG instructs the processing circuit 102 to perform a proposed highlight processing method for recording content-based snapshot pictures (or slow motion video clips) automatically and adaptively. In other words, the proposed highlight processing method may be software-based, and may be performed through hardware of the highlight processing system 100. For example, the proposed highlight processing method may include obtaining a frame sequence that includes frames each having image contents associated with at least one object, where object pose estimation is performed upon each frame of the frame sequence to generate an object pose estimation result of each frame; and may further include determining at least one of a start point and an end point of a highlight interval, where comparison of object pose estimation results of different frames is involved in determination of at least one of the start point and the end point of the highlight interval.

In some embodiments of the present invention, the highlight processing system 100 may be a part of an electronic device with a camera module, the processing circuit 102 may be a processor of the electronic device, and the storage device 104 may be a system memory of the electronic device. For example, the electronic device may be a cellular phone or a tablet. However, this is for illustrative purposes only, and is not meant to be a limitation of the present invention. In practice, any electronic device using the proposed highlight processing method falls within the scope of the present invention.

Figure 2:
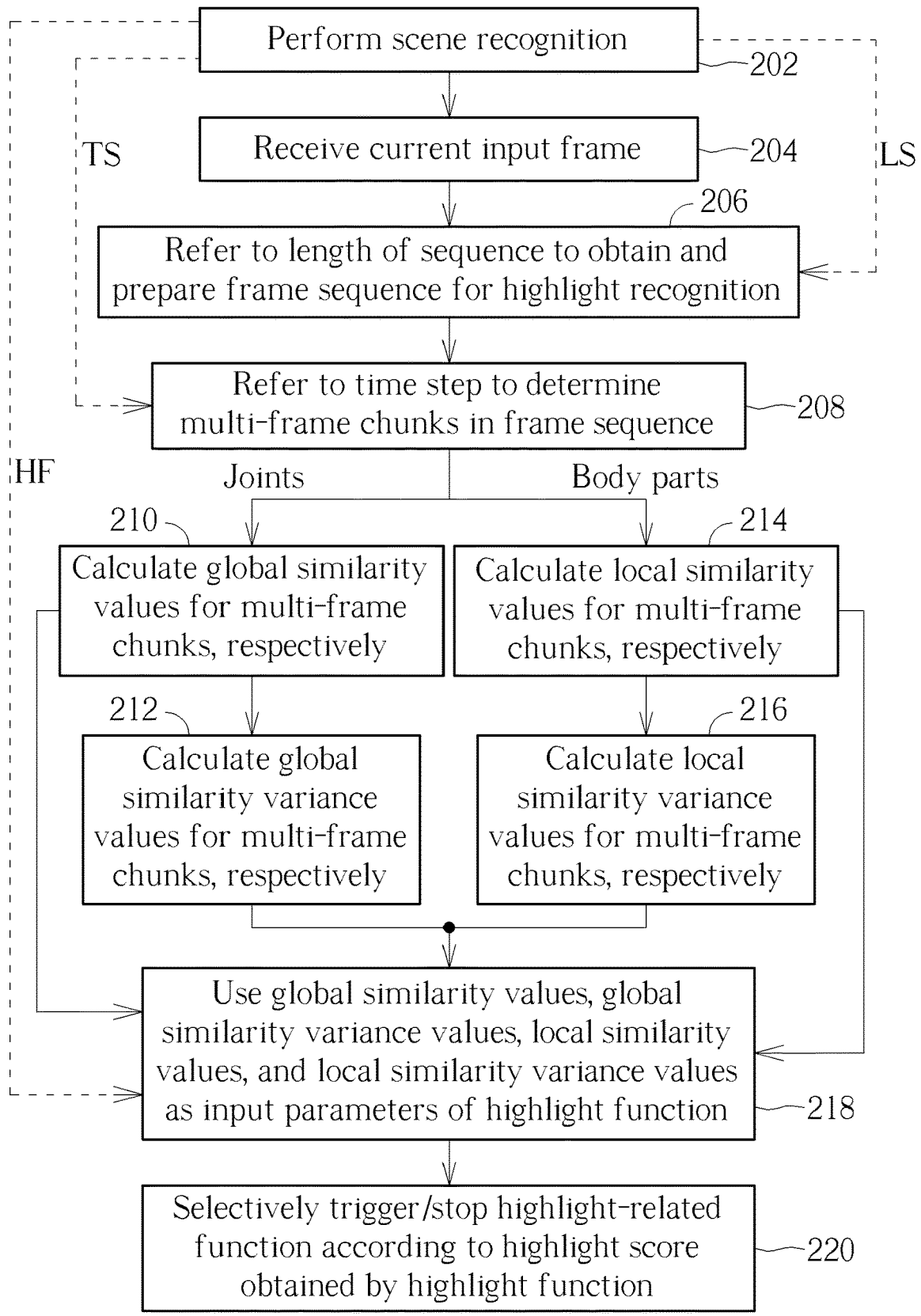
FIG. 2 is a flowchart illustrating a first highlight processing method according to an embodiment of the present invention.

FIG. 2 is a flowchart illustrating a first highlight processing method according to an embodiment of the present invention. The highlight processing method is performed by the highlight processing system 100 shown in FIG. 1. Provided that the result is substantially the same, the steps are not required to be executed in the exact order shown in FIG. 2. Besides, some of the steps shown in FIG. 2 may be omitted, and some other steps may be added to the flow show in FIG. 2. At step 202, a scene recognition process is performed to classify a scene type associated with a streaming frame input. In accordance with the scene type, the length of sequence LS, the time step TS, and the highlight function HF are set. In some embodiments of the present invention, the length of sequence LS may have different settings for different scene types, the time step TS may have different settings for different scene types, and/or the highlight function HF may have different settings for different scene types. By way of example, but not limitation, different scene types may include one scene type for a sports scene and another scene type for a non-sports scene.

At step 204, a current input frame is available from the streaming frame input. At step 206, a frame sequence with the length of sequence LS is obtained and prepared for undergoing the following highlight recognition process. For example, the frame sequence includes N frames F_1-F_N each having image contents associated with at least one object (e.g., at least one person), where N=LS. The frame F_N with a timestamp t_N is the current input frame, and the frames F_1-F_N−1 with timestamps t_1-t_N−1 are previous input frames. The present invention has no limitations on the size of the length of sequence LS. In practice, the length of sequence LS may be adjusted, depending upon the actual design considerations.

In one exemplary implementation, the frames F_1-F_N selected for the frame sequence may be continuous in the time domain. That is, the frames F_1-F_N are consecutive frames in the streaming frame input. In another exemplary implementation, the frames F_1-F_N selected for the frame sequence may be discontinuous in the time domain. That is, the frames F_1-F_N are not consecutive frames in the streaming frame input. For example, the frames F_1-F_N are selected from the streaming frame input intermittently. In yet another exemplary implementation, the frames F_1-F_N selected for the frame sequence may be partly continuous in the time domain and partly discontinuous in the time domain. That is, the frames F_1-F_N includes frames that are consecutive frames in the streaming frame input, and also include frames that are not consecutive frames in the streaming frame input.

Furthermore, object pose estimation (e.g., human pose estimation) is performed upon each frame of the frame sequence to generate an object pose estimation result of the frame (e.g., a human pose estimation result of the frame). For clarity and simplicity, the following assumes that each object in a frame to be detected and analyzed is one person, and the object pose estimation is human pose estimation that is used to generate a human pose estimation result as the object pose estimation result. However, this is for illustrative purposes only, and is not meant to be a limitation. In practice, the same highlight processing concept of the present invention can be employed for dealing with highlights of non-human targets. To put it simply, the terms "object" and "person" are interchangeable, the terms "object pose" and "human pose" are interchangeable, the terms "object pose estimation" and "human pose estimation" are interchangeable, and the terms "object pose estimation result" and "human pose estimation result" are interchangeable.

For example, image contents associated with one person are analyzed to identify human body parts such a head, a torso, a left upper arm, a left lower arm, a left upper leg, a left lower leg, a right upper arm, a right lower arm, a right upper leg, and a right lower leg. In addition, joints of the human body parts (e.g., head, torso, left upper arm, left lower arm, left upper leg, left lower leg, right upper arm, right lower arm, right upper leg, and right lower leg) can also be identified. Hence, regarding image contents of each person that are included in a frame, the human pose estimation result of the frame may include position information of joints of a human pose and/or position information of body parts of the human pose, where each body part includes a portion of all joints of the human pose only.

It should be noted that the frame sequence prepared at step 206 can be updated when a next input frame is input to act as a current input face received at step 204. For example, the frame sequence includes N frames F_2-F_N+1 each having image contents associated with at least one person, where N=LS. The frame F_N+1 with a timestamp t_N+1 is the current input frame, and the frames F_2-F_N with timestamps t_2-t_N are previous input frames. It should be noted that, depending upon the actual design considerations, the frames F_2-F_N+1 selected for the frame sequence may be continuous in the time domain, or may be discontinuous in the time domain, or may be partly continuous in the time domain and partly discontinuous in the time domain.

At step 208, the frame sequence (which includes frames F_1-F_N) is divided into a plurality of multi-frame chunks CK_1-CK_M according to the time step TS. In a case where TS=1 (e.g., one frame period), every two frames with timestamps t_i and t_i+1 is categorized as one multi-frame chunk, where i={1, 2, 3, 4, . . . , N−1}. In another case where TS=2 (e.g., two frame periods), every three frames with timestamps t_i, t_i+1, and t_i+2 is categorized as one multi-frame chunk, where i={1, 2, 3, 4, . . . , N−2}.

Specifically, each multi-frame chunk is selected by a moving window with a window size that is set on the basis of the time step TS. The present invention has no limitations on the size of the time step TS. In practice, the time step TS may be adjusted, depending upon the actual design considerations.

In this embodiment, the highlight recognition process includes global metric computation (steps 210 and 212) and local metric computation (steps 214 and 216). The human pose estimation result of each frame includes position information of joints of human pose(s) in the frame and position information of body parts of the human pose(s) in the frame. For each of the multi-frame chunks that are determined at step 208, a global similarity value is calculated by evaluating similarity between the first frame (i.e., earliest frame) and the last frame (i.e., latest frame) of the multi-frame chunk according to position information of all joints of human poses identified in the first frame (i.e., earliest frame) and the last frame (i.e., latest frame) of the multi-frame chunk (step 210), and a global similarity variance value is calculated to indicate variance of the global similarity value (step 212). For each of the multi-frame chunks that are determined at step 208, a local similarity value is calculated by evaluating similarity between the first frame (i.e., earliest frame) and the last frame (i.e., latest frame) of the multi-frame chunk according to position information of body parts of human poses identified in the first frame (i.e., earliest frame) and the last frame (i.e., latest frame) of the multi-frame chunk (step 214), and a local similarity variance value is calculated to indicate variance of the local similarity value (step 216).

In a case where TS=1 (e.g., one frame period), every two frames with timestamps t_i and t_i+1 is categorized as one multi-frame chunk, where i={1, 2, 3, 4, . . . , N−1}. Hence, a global similarity value is calculated by evaluating similarity between two frames with timestamps t_i and t_i+1, and a local similarity value is calculated by evaluating similarity between two frames with timestamps t_i and t_i+1. Regarding one multi-frame chunk, the frame with timestamp t_i is the first frame, and the frame with timestamp t_i+1 is the last frame.

In another case where TS=2 (e.g., two frame periods), every three frames with timestamps t_i, t_i+1, and t_i+2 is categorized as one multi-frame chunk, where i={1, 2, 3, 4, . . . , N−2}. Hence, a global similarity value is calculated by evaluating similarity between two frames with timestamps t_i and t_i+2, and a local similarity value is calculated by evaluating similarity between two frames with timestamps t_i and t_i+2. Regarding one multi-frame chunk, the frame with timestamp t_i is the first frame, and the frame with timestamp t_i+2 is the last frame.

Figure 3:
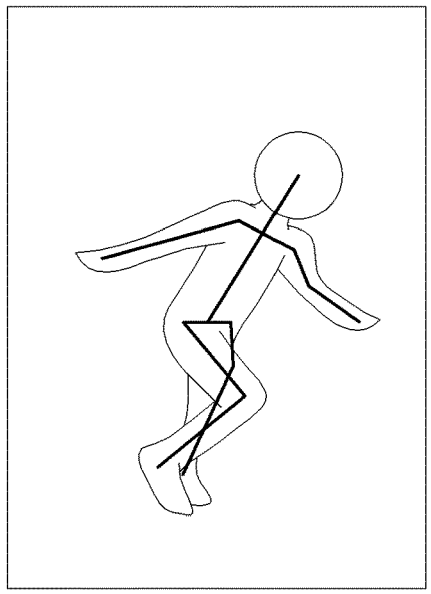
FIG. 3 is a diagram illustrating human pose estimation results of two frames according to an embodiment of the present invention.
Figure 3:
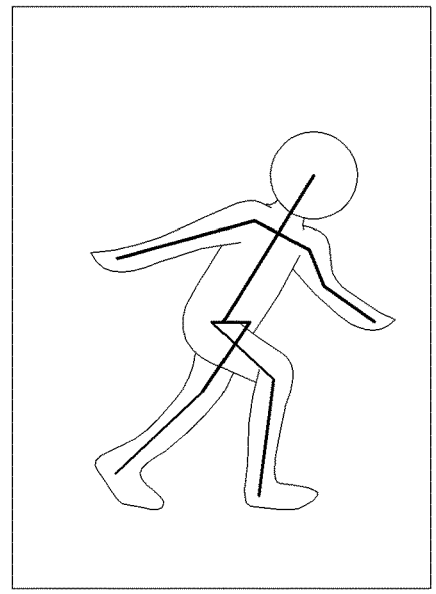

FIG. 3 is a diagram illustrating human pose estimation results of two frames according to an embodiment of the present invention. In this embodiment, two consecutive frames, including a frame F_1 with a time stamp t_1 and a frame F_2 with a time stamp t_2, have image contents of the same running person. A human pose of the running person as shown in the frame F_1 includes joints $P_{t1}$, and consists of body parts $B_{t1}$, wherein $(J_{t10}, J_{t11}, \ldots, J_{t1k})$ record positions of all joints of the human pose, and $(B_{t10}, B_{t11}, \ldots, B_{t1n})$ record positions of all body parts of the human pose. A body part $B_{t1i}$ selected from $B_{t1}$ includes joints $(J_{t1i0}, J_{t1i1}, \ldots, J_{t1im})$ selected from $P_{t1}$, where i={0, 1, . . . , n}. A human pose of the person as shown in the frame F_2 includes joints $P_{t2}$, and consists of body parts $B_{t2}$, wherein $(J_{t20}, J_{t21}, \ldots, J_{t2k})$ record positions of all joints of the human pose, and $(B_{t20}, B_{t21}, \ldots, B_{t2n})$ record positions of all body parts of the human pose. A body part $B_{t2i}$ selected from $B_{t2}$ includes joints $(J_{t2i0}, J_{t2i1}, \ldots, J_{t2im})$ selected from $P_{t2}$, where i={0, 1, . . . , n}.

Assuming that the time step TS is set by one (i.e., TS=t_2−t_1=one frame period), the frames F_1 and F_2 are categorized as a multi-frame chunk CK_1. At step 210, the joints $P_{t1}$ and $P_{t2}$ are used to calculate a global similarity value GSIM_1 for the multi-frame chunk CK_1. At step 212, the global similarity variance value GVAR_1 is calculated for the multi-frame chunk CK_1. The global similarity variance value GVAR_1 is indicative of variance of the global similarity value GSIM_1. At step 214, the body parts $B_{t1}$ and $B_{t2}$ are used to calculate local similarity values LSIM_1 for the multi-frame chunk CK_1, where one local similarity value is calculated for a same body part in different frames F_1 and F_2. At step 216, the local similarity variance values LVAR_1 are calculated for the multi-frame chunk CK_1. The local similarity variance values LVAR_1 are indicative of variance of the local similarity values LSIM_1, respectively.

It should be noted that any suitable similarity computation algorithm may be adopted by steps 210 and 214, and any suitable variance computation algorithm may be adopted by steps 212 and 216.

Figure 4:
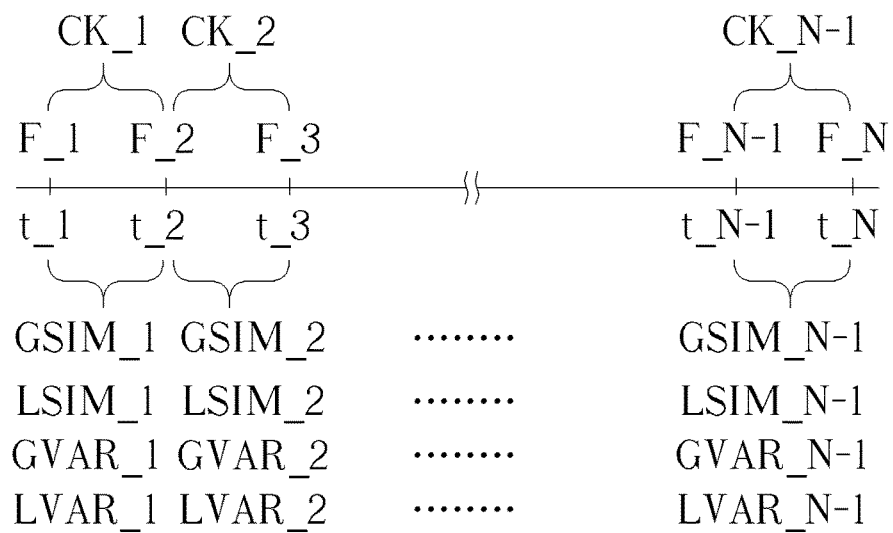
FIG. 4 is a diagram illustrating metrics calculated according to comparison that is based on human pose estimation results of frames in a frame sequence.

After steps 210, 212, 214, and 216 are done, global metrics (i.e., global similarity values and global variance values) and local metrics (i.e., local similarity values and local variance values) of one or more multi-frame chunks belonging to the frame sequence are obtained. FIG. 4 is a diagram illustrating metrics calculated according to comparison that is based on human pose estimation results of frames in a frame sequence. For example, the frame sequence includes N frames F_1-F_N, where N=LS. It should be noted that, depending upon the actual design considerations, the frames F_1-F_N selected for the frame sequence may be continuous in the time domain, or may be discontinuous in the time domain, or may be partly continuous in the time domain and partly discontinuous in the time domain.

The frame F_N with a timestamp t_N is the current input frame, and the frames F_1-F_N−1 with timestamps t_1-t_N−1 are previous input frames. In addition, the time step TS is 1 (e.g., one frame period), and the frame sequence is divided into multi-frame chunks CK_1-CK_M, where M=N−1. The metrics calculated for the multi-frame chunk CK_1 may include a global similarity value GSIM_1, a plurality of local similarity values LSIM_1, a global similarity variance value GVAR_1, and a plurality of local similarity variance values LVAR_1. The metrics calculated for the multi-frame chunk CK_2 may include a global similarity value GSIM_2, a plurality of local similarity values LSIM_2, a global similarity variance value GVAR_2, and a plurality of local similarity variance values LVAR_2. The metrics calculated for the multi-frame chunk CK_N−1 may include a global similarity value GSIM_N−1, a plurality of local similarity values LSIM_N−1, a global similarity variance value GVAR_N−1, and a plurality of local similarity variance values LVAR_N−1.

At step 218, global metrics (i.e., global similarity values and global variance values) and local metrics (i.e., local similarity values and local variance values) of one or more multi-frame chunks belonging to the frame sequence are used as input parameters of the highlight function HF that can be determined by scene recognition at step 202. The scene recognition may be based on machine learning/deep learning. The formula forms of highlight functions HF are adaptively set for different scenes. For example, highlight functions HF of different scenes may include polynomial functions, exponential functions, trigonometric functions, hyperbolic functions, etc.

At step 220, a highlight score is obtained for the current input frame by the highlight function HF, and the highlight score can be compared with a predetermined threshold to determine if a highlight-related function should be triggered or stopped, wherein the predetermined threshold may be set by scene recognition performed at step 202. For example, when the highlight score calculated for the current input frame is larger than the predetermined threshold under a condition that the highlight-related function is inactive, a start point of a highlight interval is determined, and the highlight-related function is triggered and applied to the current input frame in response to the comparison result (i.e., highlight score>predetermined threshold); when the highlight score calculated for the current input frame is larger than the predetermined threshold under a condition that the highlight-related function is active, the highlight-related function remains active and is applied to the current input frame; when the highlight score calculated for the current input frame is not larger than the predetermined threshold under a condition that the highlight-related function is active, an end point of the highlight interval is determined, and the highlight-related function is stopped and not applied to the current input frame in response to the comparison result (i.e., highlight score predetermined threshold); and when the highlight score calculated for the current input frame is not larger than the predetermined threshold under a condition that the highlight-related function is inactive, the highlight-related function remains inactive. Hence, the highlight-related function is in operation during the highlight interval.

The highlight-related function may be performed for action snapshot capture, slow motion video recording, slow motion video post-production, or any other function/action user may like to be performed on the frame sequence. In a first case where the highlight-related function is for action snapshot capture, the frame sequence can be generated from a camera module (e.g., a camera module of a cellular phone) while the camera module is currently operating under an action snapshot capture mode. In a second case where the highlight-related function is for slow motion video recording, the frame sequence can be generated from a camera module (e.g., a camera module of a cellular phone) while the camera module is currently operating under a video recording mode. In a third case where the highlight-related function is for slow motion post-production, the frame sequence can be read from a storage device under a video playback mode, wherein the frame sequence can be generated from a camera module (e.g., a camera module of a cellular phone) and stored in the storage device before the video playback mode is enabled.

Regarding the highlight recognition process of the highlight processing method shown in FIG. 2, an input of the highlight function HF may include similarity values (e.g., global similarity values and local similarity values) and similarity variance values (e.g., global similarity variance values and local similarity variance values), and an output of the highlight function HF may include a highlight score that is referenced for selectively triggering/stopping a highlight-related function. However, this is for illustrative purposes only, and is not meant to be a limitation of the present invention. Since the calculation of similarity variance values can be based on similarity values, there may exist some linear relationship among similarity values and similarity variance values. In one alternative design, the highlight processing method may be modified to employ a highlight function that is fed with similarity values only. In another alternative design, the highlight processing method may be modified to employ a highlight function that is fed with similarity variance values only.

For example, the metrics calculated for the multi-frame chunks CK_1-CK_N−1 include similarity variance values (e.g., global variance values) VAR_1-VAR_N−1. The highlight score HS obtained by the highlight function HF may be obtained by using the following formula.

$$HS = \sum_{i=1}^{i=N-1} \frac{1}{N-i} \times \text{VAR\_i} \qquad (1)$$

The highlight score HS may be compared with a predetermined threshold value to selectively triggering/stopping a highlight-related function.

Figure 5:
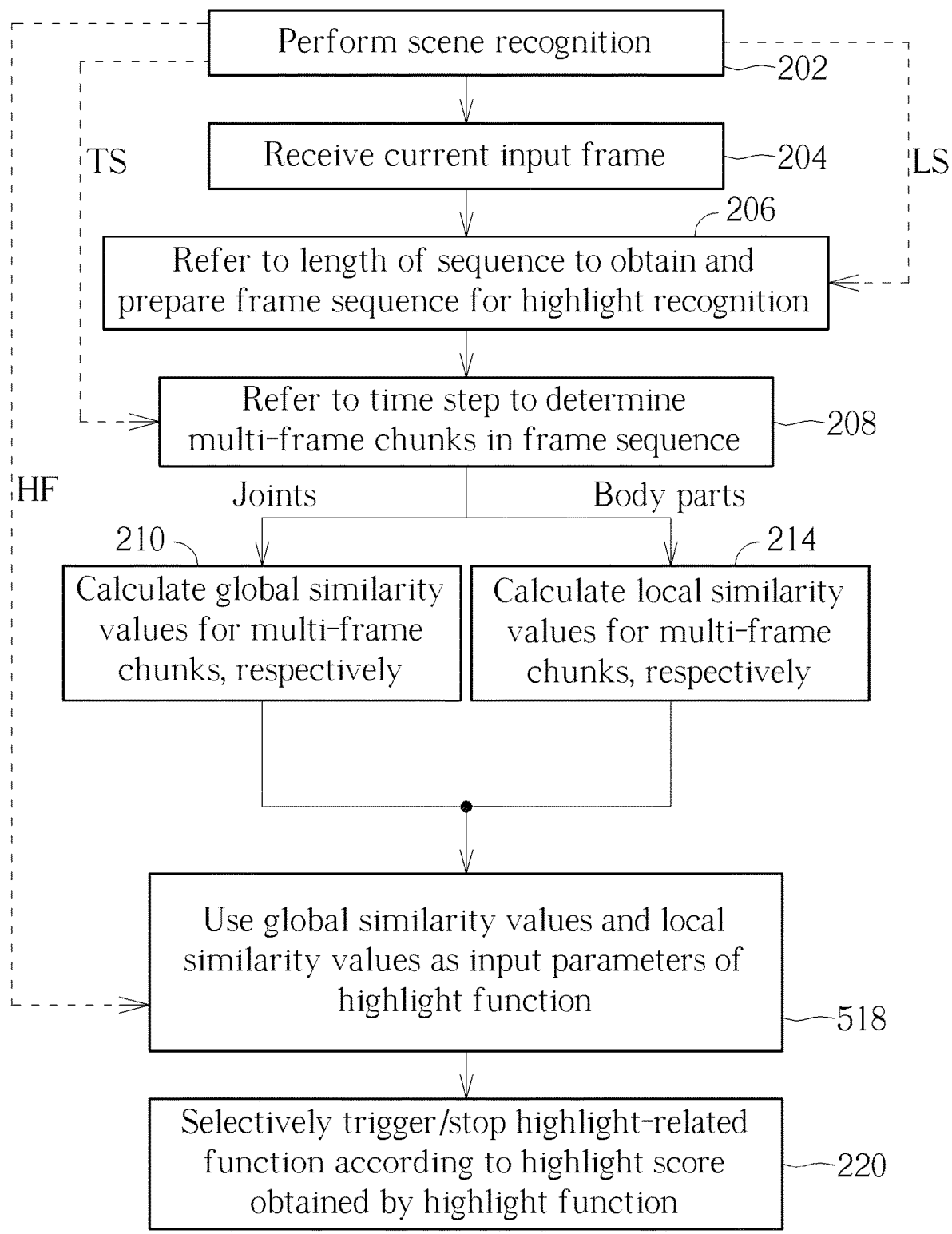
FIG. 5 is a flowchart illustrating a second highlight processing method according to an embodiment of the present invention.

FIG. 5 is a flowchart illustrating a second highlight processing method according to an embodiment of the present invention. The major difference between highlight processing methods shown in FIG. 2 and FIG. 5 is that steps 212 and 216 are omitted, such that an input of the highlight function HF used by step 518 does not include similarity variance values (e.g., global similarity variance values and local similarity variance values). In this embodiment, the input of the highlight function HF used by step 518 may include similarity values (e.g., global similarity values and local similarity values) only.

Figure 6:
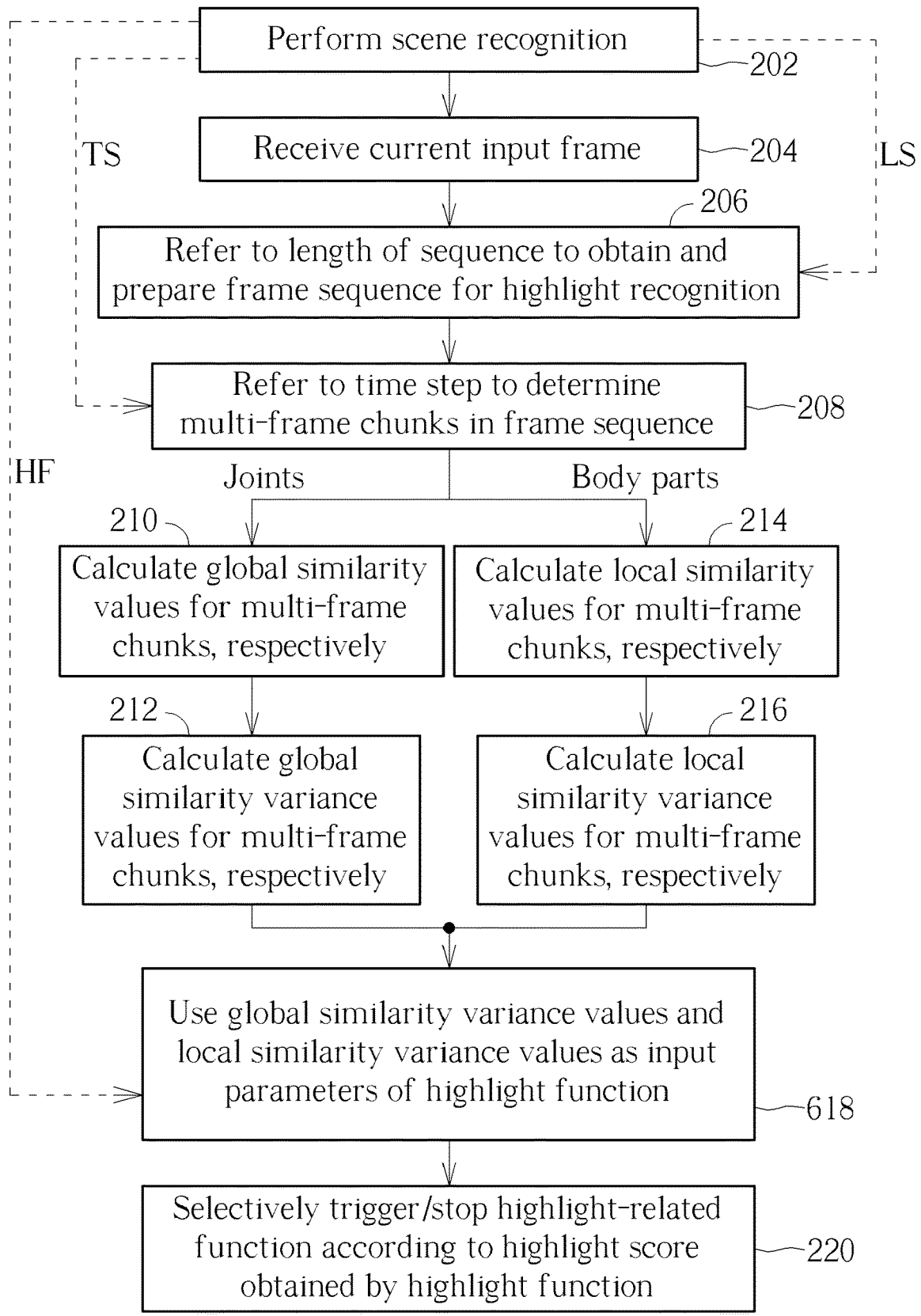
FIG. 6 is a flowchart illustrating a third highlight processing method according to an embodiment of the present invention.

FIG. 6 is a flowchart illustrating a third highlight processing method according to an embodiment of the present invention. The major difference between highlight processing methods shown in FIG. 2 and FIG. 6 is that an input of the highlight function HF used by step 618 does not include similarity values (e.g., global similarity values and local similarity values). In this embodiment, the input of the highlight function HF used by step 618 may include similarity variance values (e.g., global similarity variance values and local similarity variance values) only.

Regarding the highlight recognition process of the highlight processing method shown in FIG. 2, an input of the highlight function HF includes global metrics (e.g., global similarity values and global similarity variance values) and local metrics (e.g., local similarity values and local similarity variance values). Regarding the highlight recognition process of the highlight processing method shown in FIG. 5, an input of the highlight function HF includes global metrics (e.g., global similarity values) and local metrics (e.g., local similarity values). Regarding the highlight recognition process of the highlight processing method shown in FIG. 6, an input of the highlight function HF includes global metrics (e.g., global similarity variance values) and local metrics (e.g., local similarity variance values). However, these are for illustrative purposes only, and are not meant to be limitations of the present invention. In one alternative design, the highlight processing method may be modified to employ a highlight function that is fed with global metrics (e.g., global similarity values and/or global similarity variance values) only. In another alternative design, the highlight processing method may be modified to employ a highlight function that is fed with local metrics (e.g., local similarity values and/or local similarity variance values) only.

Figure 7:
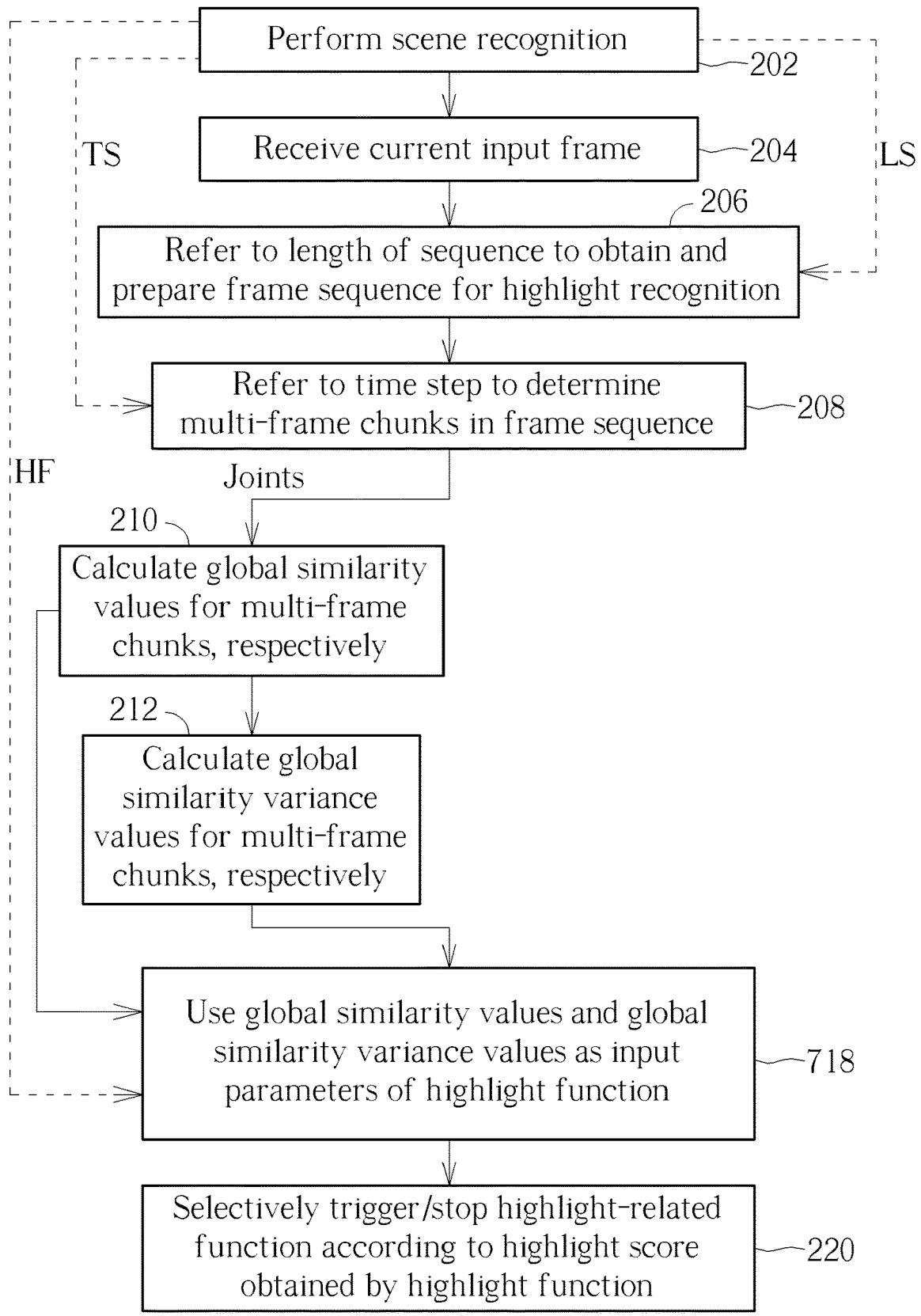
FIG. 7 is a flowchart illustrating a fourth highlight processing method according to an embodiment of the present invention.

FIG. 7 is a flowchart illustrating a fourth highlight processing method according to an embodiment of the present invention. The major difference between highlight processing methods shown in FIG. 2 and FIG. 7 is that steps 214 and 216 are omitted, such that an input of the highlight function HF used by step 718 does not include local similarity values and local similarity variance values. In this embodiment, the input of the highlight function HF used by step 718 may include global similarity values and global similarity variance values only.

Figure 8:
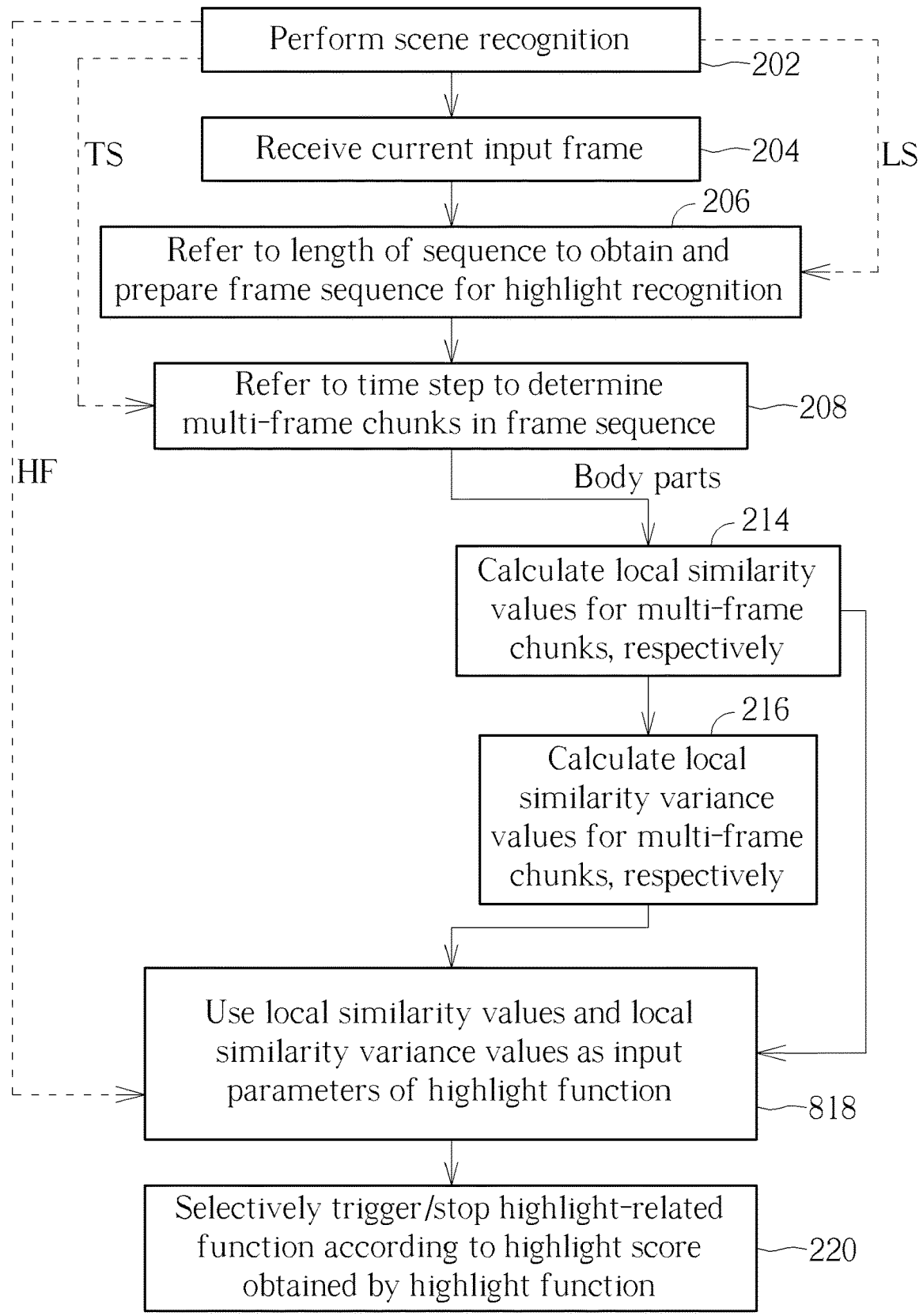
FIG. 8 is a flowchart illustrating a fifth highlight processing method according to an embodiment of the present invention.

FIG. 8 is a flowchart illustrating a fifth highlight processing method according to an embodiment of the present invention. The major difference between highlight processing methods shown in FIG. 2 and FIG. 8 is that steps 210 and 212 are omitted, such that an input of the highlight function HF used by step 818 does not include global similarity values and global similarity variance values. In this embodiment, the input of the highlight function HF used by step 818 may include local similarity values and local similarity variance values only.

Figure 9:
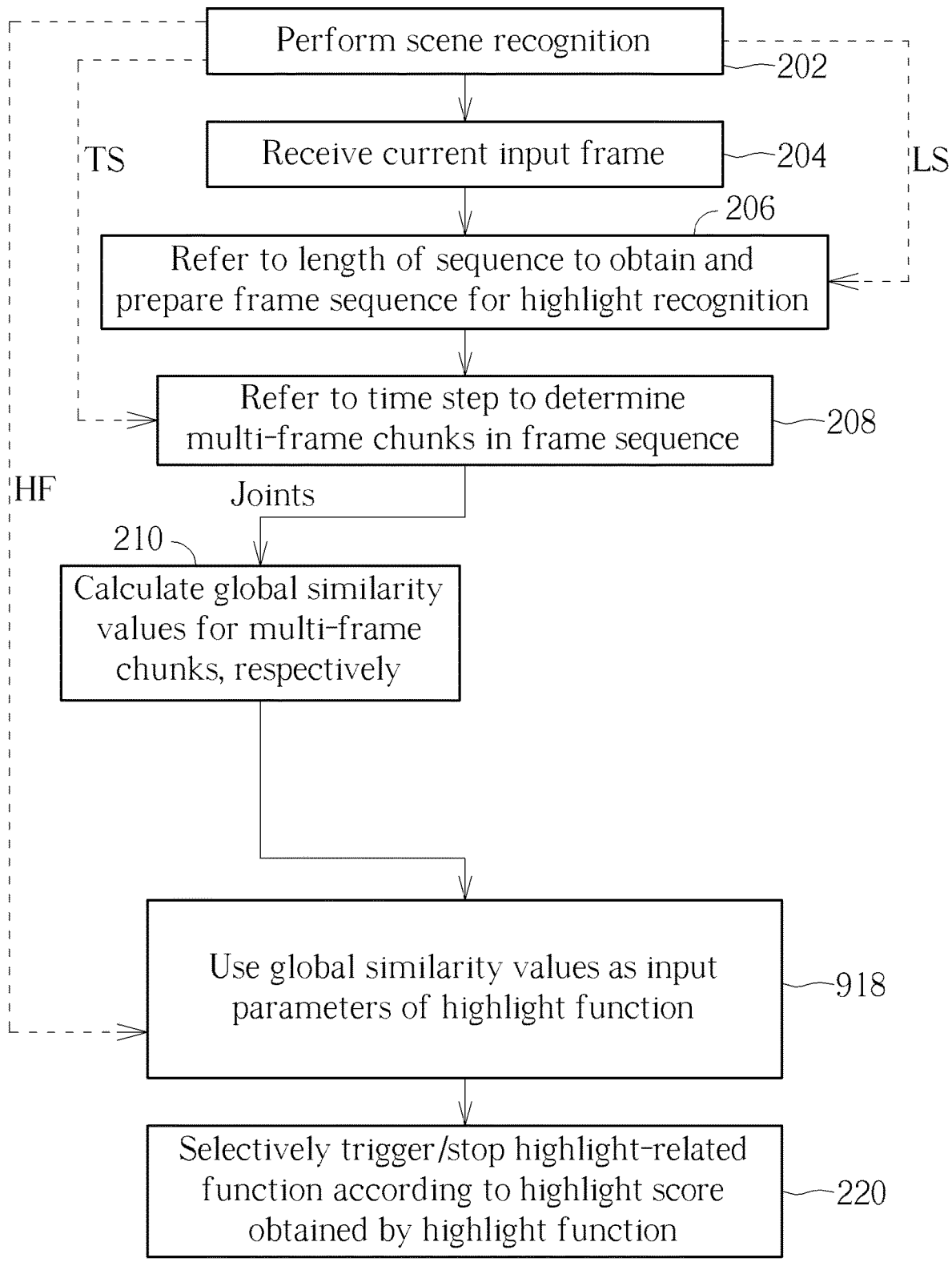
FIG. 9 is a flowchart illustrating a sixth highlight processing method according to an embodiment of the present invention.

FIG. 9 is a flowchart illustrating a sixth highlight processing method according to an embodiment of the present invention. The major difference between highlight processing methods shown in FIG. 5 and FIG. 9 is that step 214 is omitted, such that an input of the highlight function HF used by step 918 does not include local similarity values. In this embodiment, the input of the highlight function HF used by step 918 may include global similarity values only.

Figure 10:
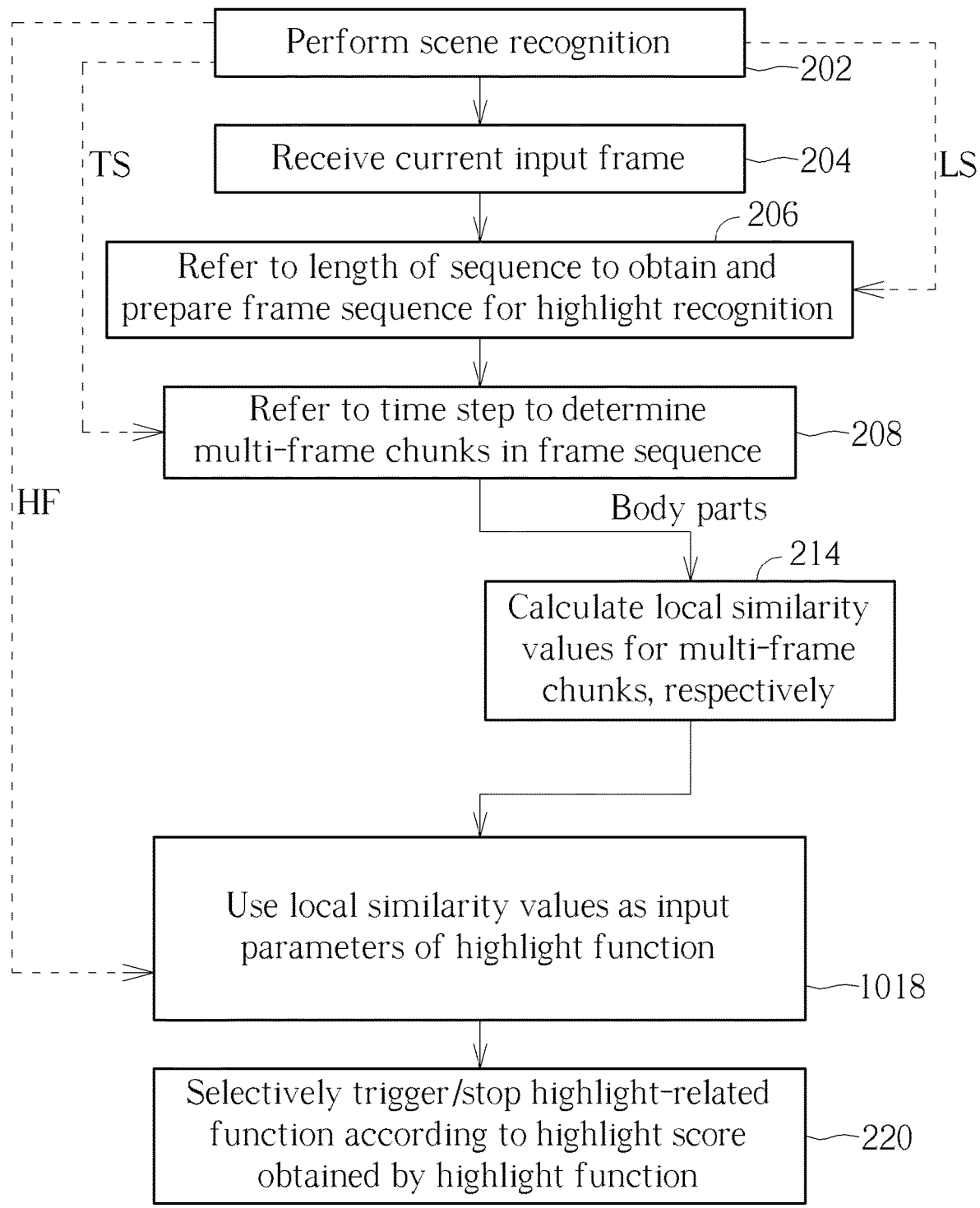
FIG. 10 is a flowchart illustrating a seventh highlight processing method according to an embodiment of the present invention.

FIG. 10 is a flowchart illustrating a seventh highlight processing method according to an embodiment of the present invention. The major difference between highlight processing methods shown in FIG. 5 and FIG. 10 is that step 210 is omitted, such that an input of the highlight function HF used by step 1018 does not include global similarity values. In this embodiment, the input of the highlight function HF used by step 1018 may include local similarity values only.

Figure 11:
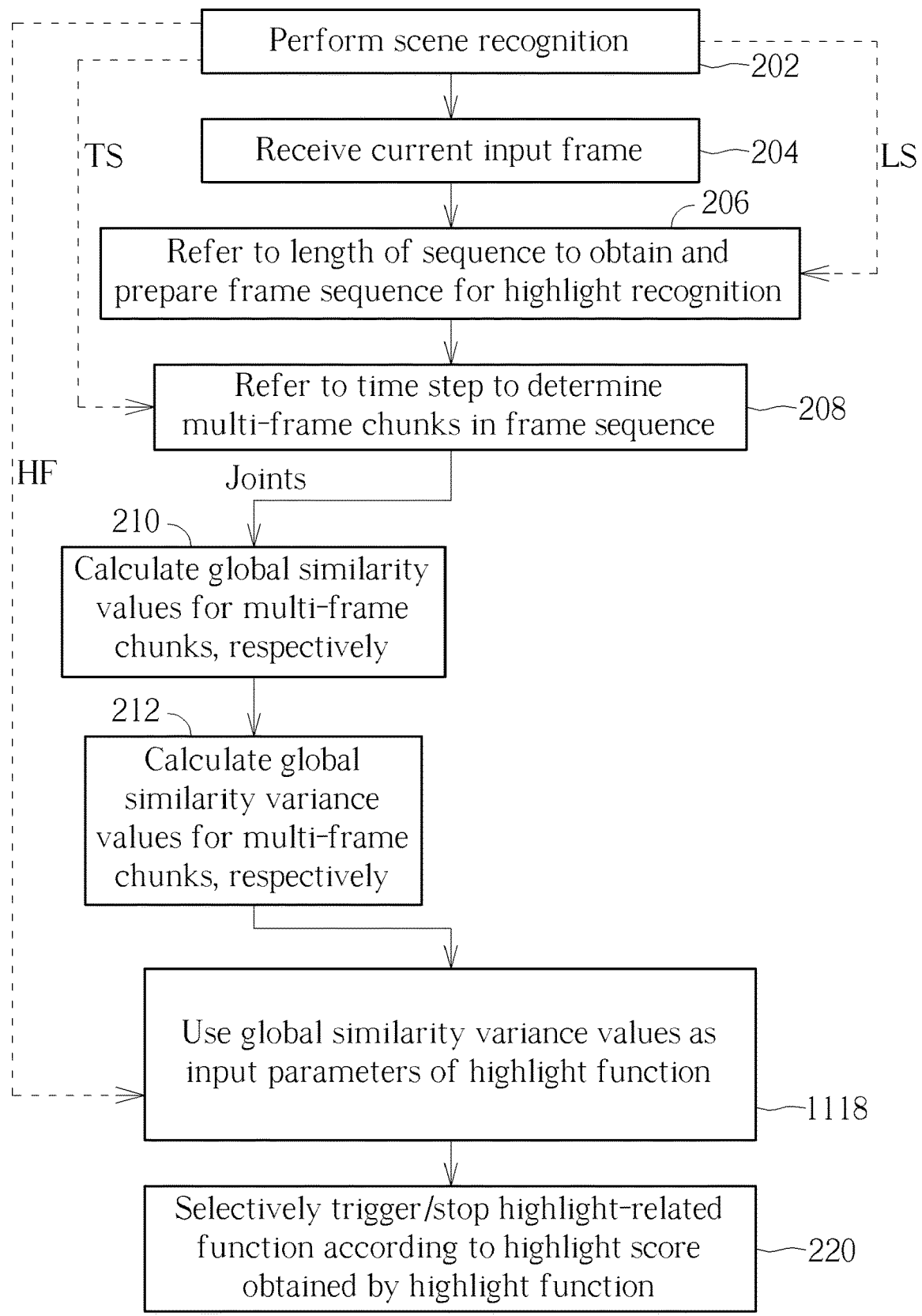
FIG. 11 is a flowchart illustrating an eighth highlight processing method according to an embodiment of the present invention.

FIG. 11 is a flowchart illustrating an eighth highlight processing method according to an embodiment of the present invention. The major difference between highlight processing methods shown in FIG. 6 and FIG. 11 is that steps 214 and 216 are omitted, such that an input of the highlight function HF used by step 1118 does not include local similarity variance values. In this embodiment, the input of the highlight function HF used by step 1118 may include global similarity variance values only.

Figure 12:
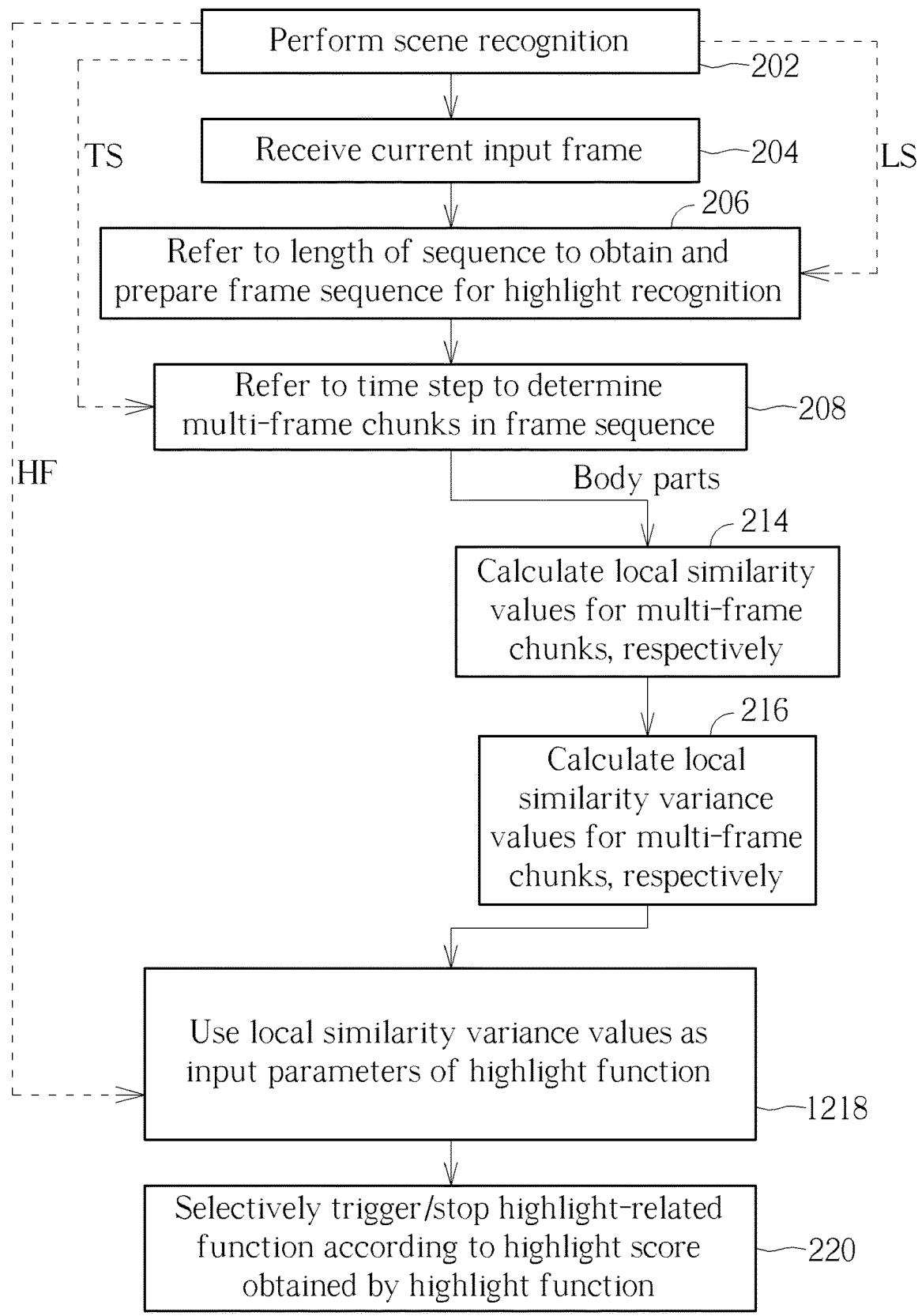
FIG. 12 is a flowchart illustrating a ninth highlight processing method according to an embodiment of the present invention.

FIG. 12 is a flowchart illustrating a ninth highlight processing method according to an embodiment of the present invention. The major difference between highlight processing methods shown in FIG. 6 and FIG. 12 is that steps 210 and 212 are omitted, such that an input of the highlight function HF used by step 1218 does not include global similarity variance values. In this embodiment, the input of the highlight function HF used by step 1218 may include local similarity variance values only.

As mentioned above, a highlight score obtained by the highlight function HF is referenced for determining whether to trigger/stop a highlight-related function (e.g., action snapshot capture, slow motion video recording, slow motion video post-production, etc.). In one exemplary design, the highlight-related function is automatically triggered at the start point of the highlight interval (which can be aligned with a last frame of one frame sequence examined by the proposed highlight recognition process) without user intervention. In another exemplary design, the highlight-related function is automatically stopped at the end point of the highlight interval (which can be aligned with a last frame of one frame sequence examined by the proposed highlight recognition process) without user intervention. In yet another exemplary design, the highlight-related function is automatically triggered at the start point of the highlight interval (which can be aligned with a last frame of one frame sequence examined by the proposed highlight recognition process) without user intervention, and the highlight-related function is automatically stopped at the end point of the highlight interval (which can be aligned with a last frame of another frame sequence examined by the proposed highlight recognition process) without user intervention.

Figure 13:
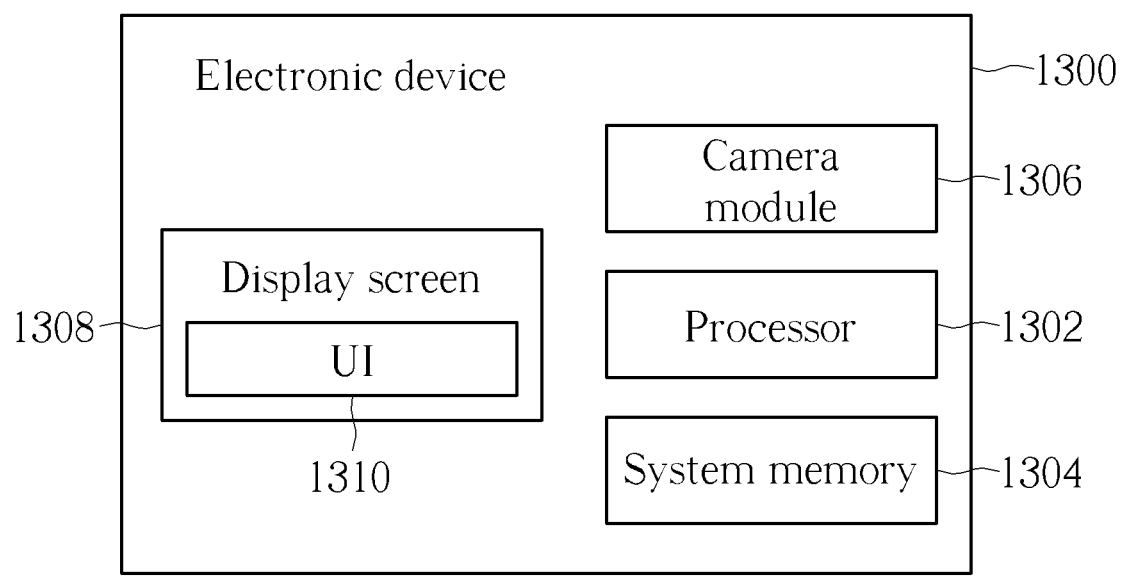
FIG. 13 is a diagram illustrating an electronic device according to an embodiment of the present invention.

Since the highlight-related function may be automatically triggered without user intervention, the present invention further proposes notifying a user when the highlight-related function is in operation. FIG. 13 is a diagram illustrating an electronic device according to an embodiment of the present invention. The electronic device 1300 includes a processor 1302, a system memory 1304, a camera module 1306, and a display screen 1308. For example, the electronic device 1300 may be a mobile device such as a cellular phone or a tablet. The highlight processing system 100 shown in FIG. 1 may be a part of the electronic device 1300 shown in FIG. 13. For example, the processing circuit 102 shown in FIG. 1 may be implemented by the processor 1302, and the storage device 104 may be implemented by the system memory 1304. The frame sequence processed by the highlight processing system may be generated from the camera module 1306 under an action snapshot capture mode, a video recording mode, a video playback mode, etc. As shown in FIG. 13, a user interface (UI) 1310 is displayed on a display screen 1308. Hence, after a highlight-related function (e.g., action snapshot capture, slow motion video recording, slow motion video post-production, etc.) is automatically triggered without user intervention, the UI 1310 can be controlled by the processor 1302 (particularly, a program code running on the processor 1302) to indicate that the highlight-related function is in operation. For example, during the highlight interval determined by the proposed highlight recognition process, joints and/or body parts of any human pose identified in each frame of the frame sequence are displayed on the UI 1310 to notify the user. For another example, during the highlight interval determined by the proposed highlight recognition process, notification information of the highlight-related function is displayed on the UI 1310 to notify the user. By way of example, but not limitation, the notification information may include the name of the highlight-related function, the similarity value, the similarity variance value, and/or the frame rate. In some alternative designs, the notification of when the highlight-related function is in operation can be implemented by ways other than the UI 1310 on the display screen 1308. For example, the notification can be implemented by a light emitting diode (LED) of the electronic device 1300 flashing, a vibrator of the electronic device 1300 vibrating, etc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A highlight processing method comprising:
obtaining a frame sequence that comprises frames each having image contents associated with at least one object, wherein object pose estimation is performed upon each frame of the frame sequence to generate an object pose estimation result of said each frame; and determining, by a processing circuit, at least one of a start point and an end point of a highlight interval, wherein comparison of object pose estimation results of different frames is involved in determination of said at least one of the start point and the end point of the highlight interval, comprising:
- calculating metrics according to comparison that is based on object pose estimation results of the frames in the frame sequence; and
- referring to the metrics for determining said at least one of the start point and the end point of the highlight interval.

2. The highlight processing method of claim 1, wherein the frame sequence comprises multi-frame chunks each having consecutive frames selected from the frames, and calculating the metrics according to the comparison that is based on the object pose estimation results of the frames in the frame sequence comprises:
- for each of the multi-frame chunks, calculating a similarity value by evaluating similarity between a first frame and a last frame of said each of the multi-frame chunks, wherein the similarity value serves as one of the metrics.

3. The highlight processing method of claim 1, wherein the frame sequence comprises multi-frame chunks each having consecutive frames selected from the frames, and calculating the metrics according to the comparison that is based on the object pose estimation results of the frames in the frame sequence comprises:
- for each of the multi-frame chunks, calculating a similarity value by evaluating similarity between a first frame and a last frame of said each of the multi-frame chunks, and calculating a similarity variance value that is indicative of variance of the similarity value, wherein the similarity variance value serves as one of the metrics.

4. The highlight processing method of claim 2, wherein position information of all joints of an object pose in an object pose estimation result of each of the first frame and the last frame is involved in computation of the similarity value.

5. The highlight processing method of claim 2, wherein position information of a part of an object pose in an object pose estimation result of each of the first frame and the last frame is involved in computation of the similarity value, where the part comprises a portion of all joints of the object pose only.

6. The highlight processing method of claim 1, further comprising:
- performing a highlight-related function during the highlight interval, wherein the highlight-related function is performed for action snapshot capture, slow motion video recording, or slow motion video post-production.

7. The highlight processing method of claim 6, wherein the highlight-related function is automatically triggered at the start point of the highlight interval without user intervention.

8. The highlight processing method of claim 7, further comprising:
- indicating, by a user interface (UI), that the highlight-related function is in operation.

9. The highlight processing method of claim 6, wherein the highlight-related function is automatically stopped at the end point of the highlight interval without user intervention.

10. A highlight processing system comprising:
- a storage device, arranged to store a program code; and
- a processing circuit, wherein when loaded and executed by the processing circuit, the program code instructs the processing circuit to perform following steps:
  - obtaining a frame sequence that comprises frames each having image contents associated with at least one object, wherein object pose estimation is performed upon each frame of the frame sequence to generate an object pose estimation result of said each frame; and
  - determining at least one of a start point and an end point of a highlight interval, wherein comparison of object pose estimation results of different frames is involved in determination of said at least one of the start point and the end point of the highlight interval, comprising:
    - calculating metrics according to comparison that is based on object pose estimation results of the frames in the frame sequence; and
    - referring to the metrics for determining said at least one of the start point and the end point of the highlight interval.

11. The highlight processing system of claim 10, wherein the frame sequence comprises multi-frame chunks each having consecutive frames selected from the frames, and calculating the metrics according to the comparison that is based on the object pose estimation results of the frames in the frame sequence comprises:
- for each of the multi-frame chunks, calculating a similarity value by evaluating similarity between a first frame and a last frame of said each of the multi-frame chunks, wherein the similarity value serves as one of the metrics.

12. The highlight processing system of claim 10, wherein the frame sequence comprises multi-frame chunks each having consecutive frames selected from the frames, and calculating the metrics according to the comparison that is based on the object pose estimation results of the frames in the frame sequence comprises:
- for each of the multi-frame chunks, calculating a similarity value by evaluating similarity between a first frame and a last frame of said each of the multi-frame chunks, and calculating a similarity variance value that is indicative of variance of the similarity value, wherein the similarity variance value serves as one of the metrics.

13. The highlight processing system of claim 11, wherein position information of all joints of an object pose in an object pose estimation result of each of the first frame and the last frame is involved in computation of the similarity value.

14. The highlight processing system of claim 11, wherein position information of a part of an object pose in an object pose estimation result of each of the first frame and the last frame is involved in computation of the similarity value, where the part comprises a portion of all joints of the object pose only.

15. The highlight processing system of claim 10, further comprising:
- performing a highlight-related function during the highlight interval, wherein the highlight-related function is performed for action snapshot capture, slow motion video recording, or slow motion video post-production.

16. The highlight processing system of claim 15, wherein the highlight-related function is automatically triggered at the start point of the highlight interval without user intervention.

17. The highlight processing system of claim 16, further comprising:
   indicating, by a user interface (UI), that the highlight-related function is in operation.

18. The highlight processing system of claim 15, wherein the highlight-related function is automatically stopped at the end point of the highlight interval without user intervention.

* * * * *